A - SINGLE-PAGE TEST
B - TURNED-PAGE TEST
C - FLATNESS TEST
D - CAMERA OPERATED
E - SPOT DETECTION

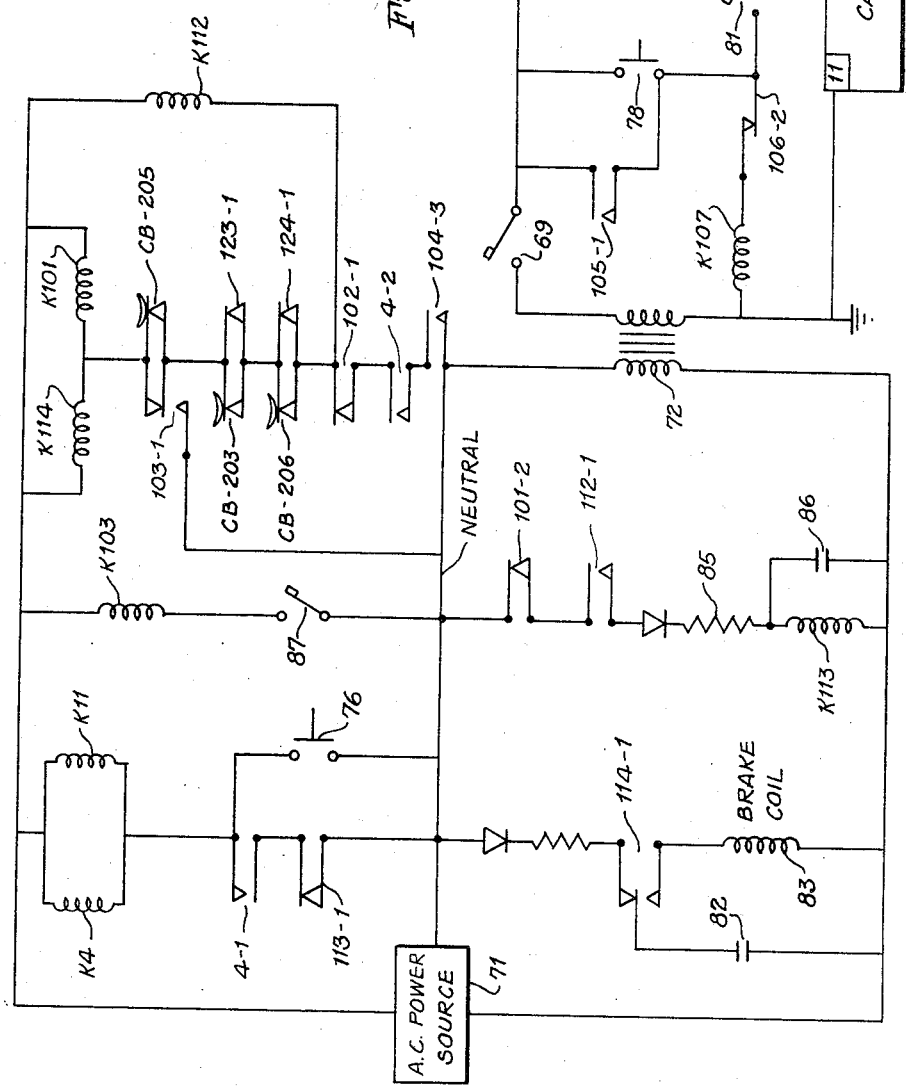

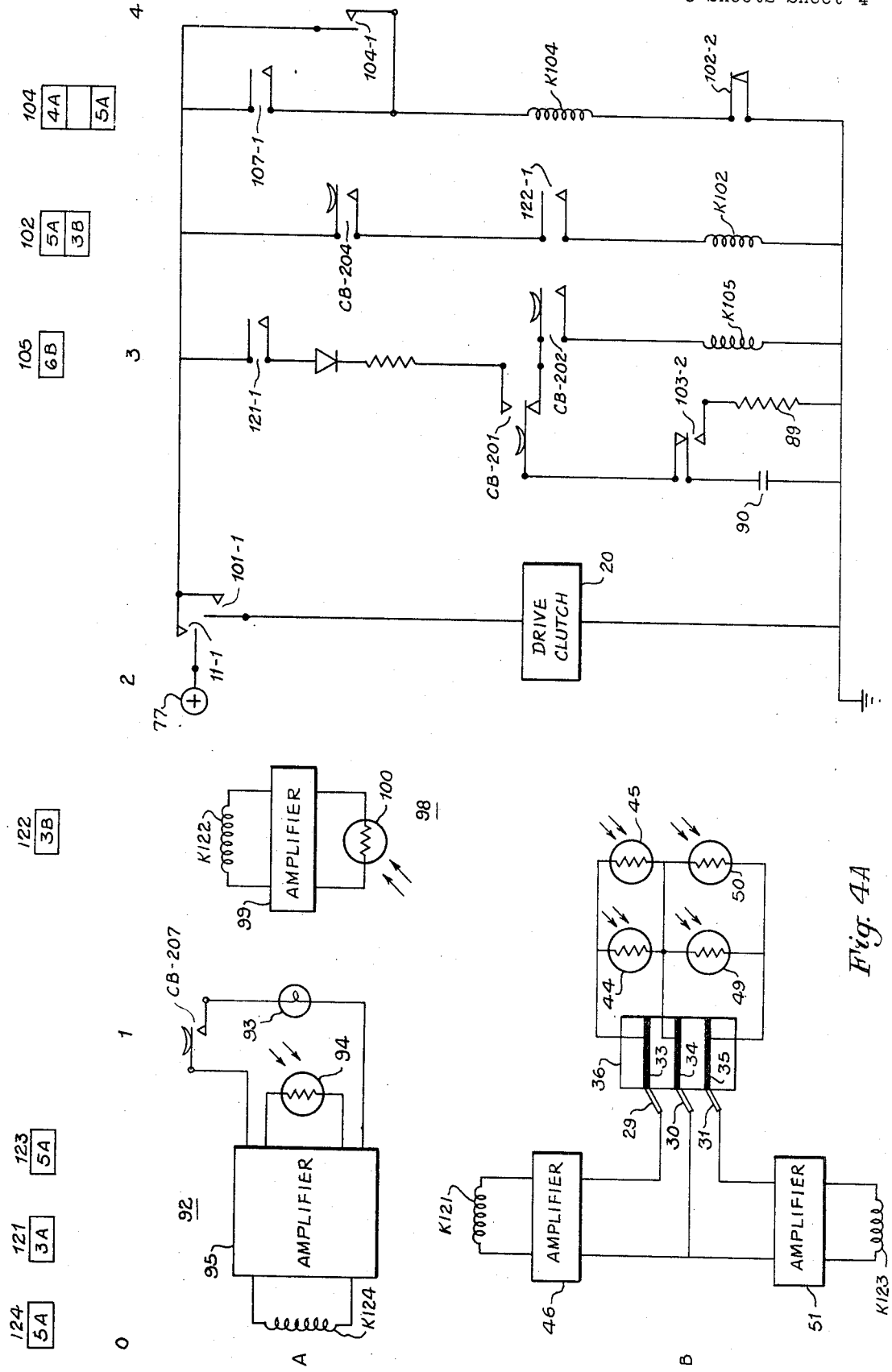

United States Patent Office 3,522,434
Patented Aug. 4, 1970

3,522,434
PHOTOCELL AND CONTROL CIRCUIT FOR AN
AUTOMATIC PAGE TURNER
Robert J. Varson, Washington, D.C., and Robert L. Johnson, Waldorf, Md., assignors to the United States of America as represented by the Secretary of Commerce
Filed Nov. 12, 1968, Ser. No. 774,734
Int. Cl. G09f 11/08; H01j 39/12
U.S. Cl. 250—208
11 Claims

ABSTRACT OF THE DISCLOSURE

A circuit is described for testing the operation of a page turner and for controlling the turner and a related camera. A vacuum head, positioned on a revolving arm, turns the pages of a bound volume and a brush flattens each turned page. When a page is not turned or the arm is reset, the camera remains inoperative. When more than one page is turned or a page is turned but not flattened, the turner is inactivated. The turner is stopped after a spot on a predetermined page is sensed.

BACKGROUND OF THE INVENTION

This invention may be used to coordinate the operation of a camera and an automatic page turner, and to test and control the operation of the turner, whereby the pages in a bound volume can be automatically turned, flattened and photographed in sequence.

One type of turner that may be controlled by the present invention is described in copending application Ser. No. 715,343, entitled "Automatic Sheet Turner Using Rotating Vacuum Head," which was filed on Mar. 22, 1968 by Anthony A. Berlinsky et al. and was issued on Dec. 23, 1969, as U.S. Pat. No. 3,484,970. In the copending application, a vacuum head is rotated around its longitudinal axis and is also revolved in a selected plane on the end of a revolving arm. As the head engages the edge of a page of a booklet held flat on a vacuum table, the page is attracted to the head. As the head continues to rotate the page is turned. A brush sweeps the turned page to flatten it against the table.

The control circuit, described here, monitors and controls the operation of the page turner so that when more than one page is turned, or a page is turned but not flattened, the turner is stopped. The circuit includes an interlock between the camera and page turner so that when a page is not turned or the arm is reset, the camera is not operated. The circuit responds to a spot on a selected page to stop the turner.

SUMMARY OF THE INVENTION

In accordance with the present invention, a control circuit is provided for an automatic page turner. Under normal operating conditions, the pages of a bound volume are turned automatically, flattened, and photographed in sequence. When a single page is turned during a cycle of operation, the control circuit actuates a camera to photograph the turned page. If more than one page is turned, or if a page has been turned but not flattened, the circuit inactivates the page turner. When a page is not turned or the turner is inactivated and then reset, the control circuit prevents operation of the camera during the cycle of operation. When a spot on a predetermined page is sensed, the turner is stopped.

BRIEF DESCRIPTION OF THE DRAWING

FIG. 4 is a block diagram that represents the assembly of FIGS. 4A and 4B;
FIGS. 4A and 4B comprise an embodiment of the control circuit in the present invention.

DESCRIPTION OF A PREFERRED EMBODIMENT

Figure 1:
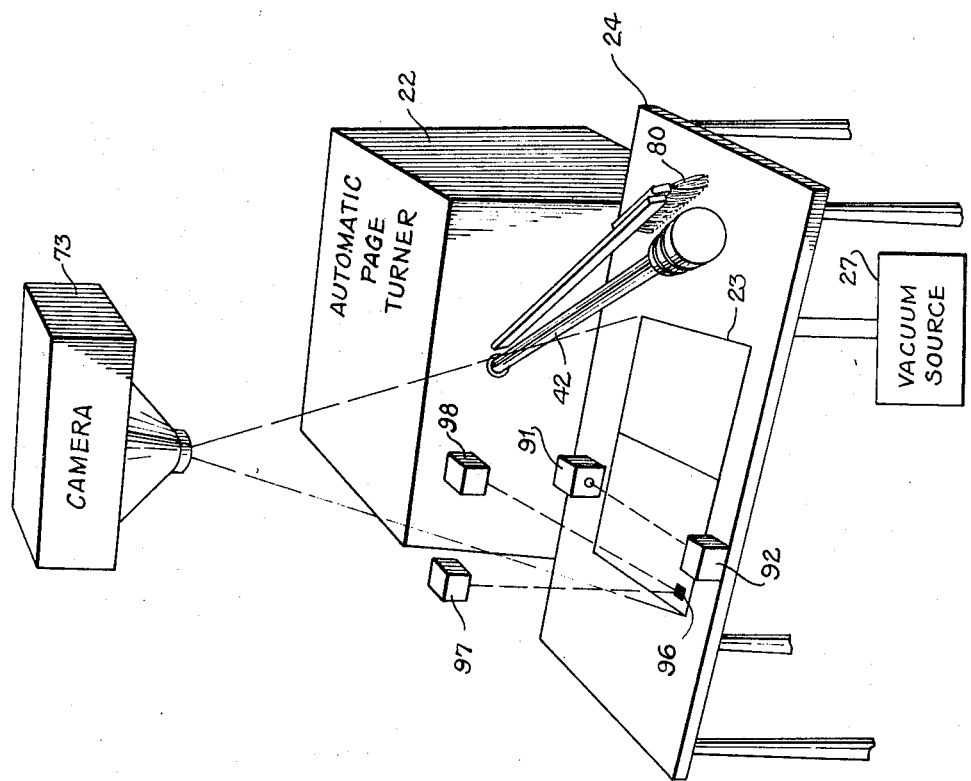
FIG. 1 is a pictorial representing the cooperation of some of the elements of the present invention with a camera and an automatic page turner.
Figure 3:
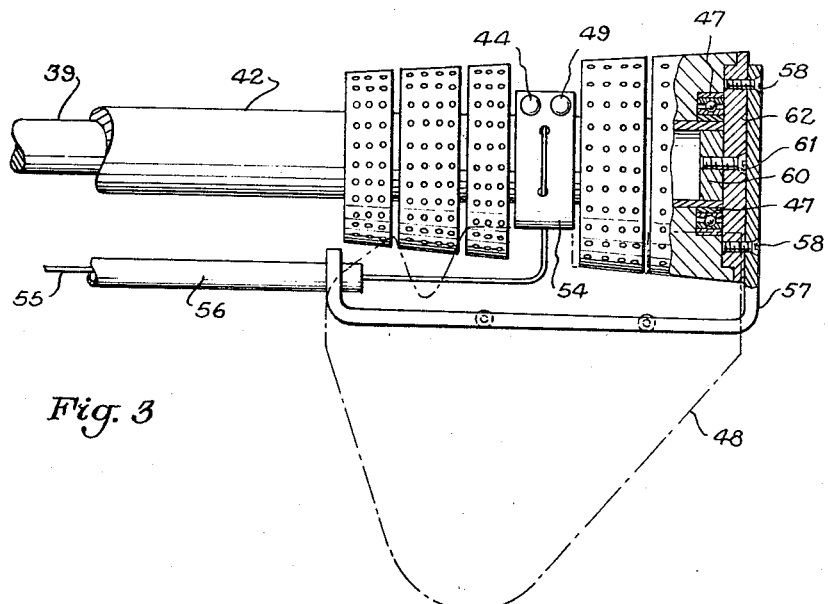
FIG. 3 shows a vacuum head and two of the photocells used in the control circuit in FIGS. 4A and 4B.
Figure 2:
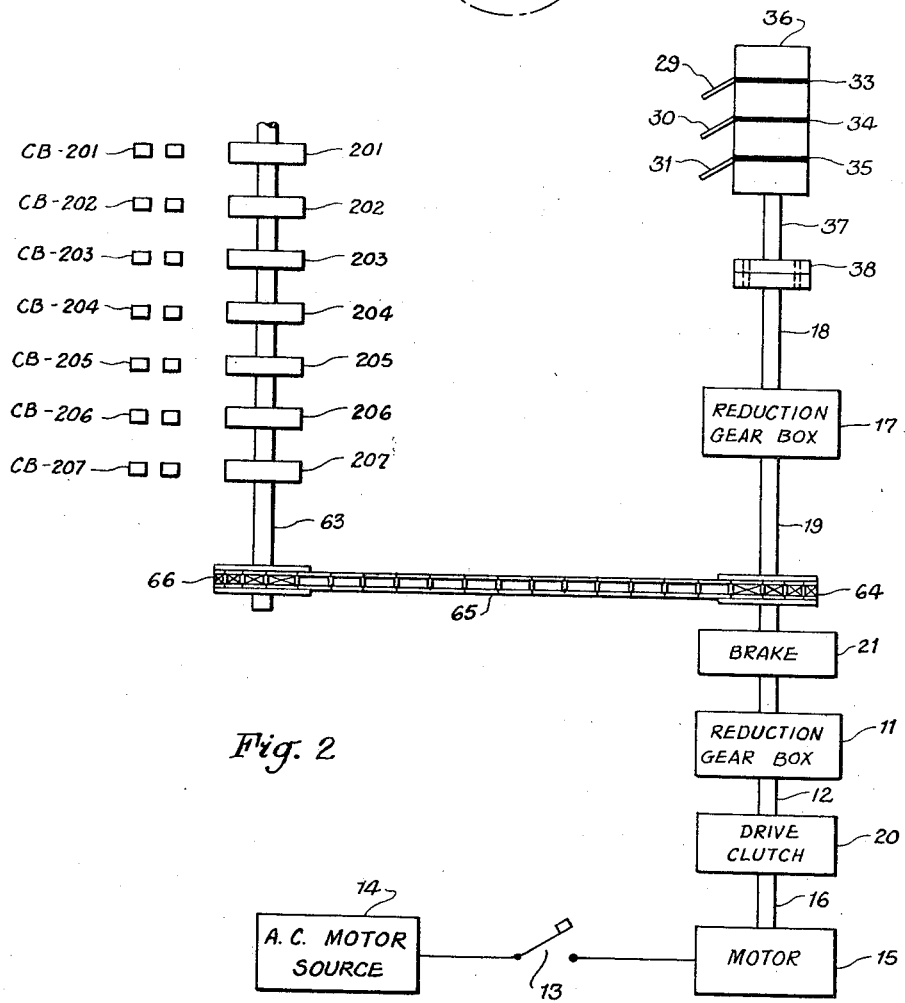
FIG. 2 illustrates the cooperation of some of the components in the present invention with components in the copending application.

When switch 13 in FIG. 2 is closed, AC power source 14 energizes motor 15 to drive shaft 16. If drive clutch 20 is engaged and brake 21 released, shaft 18 will be driven through shafts 12, 19 and gear reduction boxes 11, 17. Shaft 18 in turn drives the mechanism in automatic page turner 22 (FIG. 1) which causes arm 39 (FIG. 3) to revolve in a selected plane. Vacuum head 42 is rotatably mounted on arm 39 by means of bearings 47.

When arm 39 is revolved in its selected plane, head 42 rotates around its longitudinal axis. The output of vacuum source 27 (FIG. 1) is applied to the head during a time interval that starts prior to the time that the head engages an edge of the top page of booklet 23 and extends to the time after the head passes over the center of the booklet. Thus, as the head engages a corner of the top page of booklet 23, which is held flat on table 24 by vacuum source 27, the page is attracted to the head and turned. After the page has been turned, it is flattened by brush 80, which revolves with arm 39.

Figure 6:
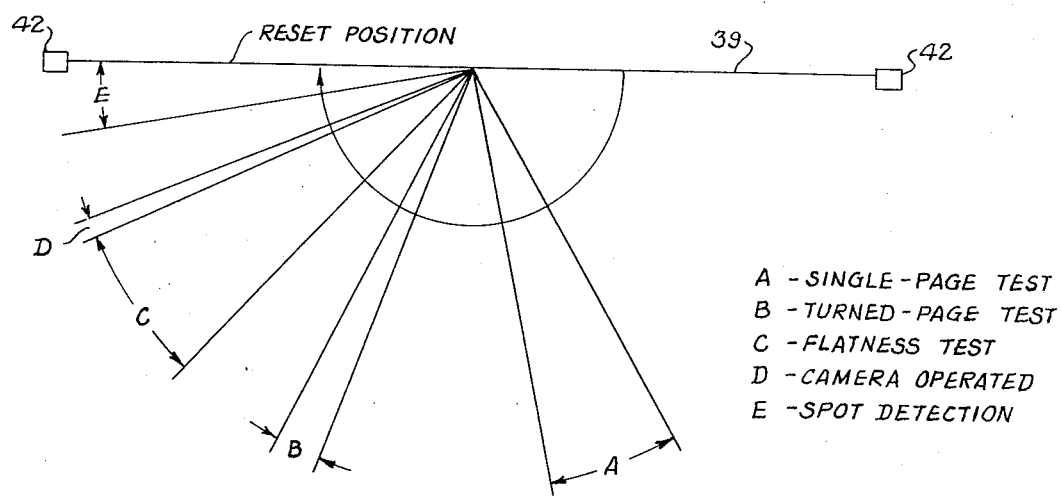
FIG. 6 is a sequence chart used in explaining the test operations of the present invention.

Page turner 22 employs two vacuum heads 42, positioned 180° apart, on the arm 39 as illustrated schematically in FIG. 6. One of the heads is represented in FIG. 1 and shown in greater detail in FIG. 3.

The details of page turner 22 (which operate arm 39, heads 42, and brush 80) are shown in the copending application. Switch 13, source 14, motor 15, shafts 16, 18 and gear reduction box 17 are also shown in the latter application.

Brushes 29, 30 and 31 are in contact with rings 33, 34 and 35, respectively, on commutator 36 in FIG. 2. The commutator is mounted on shaft 37 which is connected to shaft 18 by means of coupling unit 38. The brushes are mounted in a fixed position on vacuum stand 32 (not shown) in the copending application.

As represented in FIG. 4A, photocells 44 and 45 are connected through rings 33, 34 and brushes 29, 30 as the input of amplifier 46, and relay K121 forms the output of 46. Likewise, photocells 49 and 50 are connected through rings 34, 35 and brushes 30, 31 as the input to amplifier 51, while relay K123 forms the output of 51.

Relays K121 and K123 are dark operated. More specifically, when a certain level of light, e.g. the light from a source passing through a single sheet of paper, falls on photocell 44 the resistance of the photocell is such that amplifier 46 operates relay K121. Further, when another level of light, e.g. the light from the same source passing through two or more sheets of the same type of paper, falls on photocell 49, amplifier 51 operates relay K123.

Photocells 44 and 49 are positioned on a support member 54 (FIG. 3) connected to peeler 48 by conventional means (not shown). If a plane is drawn through the center of vacuum head 42 and parallel to the surface of table 24, the faces of the photocells are positioned in another plane making a 45° angle with the former one. Photocells 45 and 50 are located in the same manner as 44 and 49, on a support member connected to the paper peeler associated with the vacuum head 42 that is not illustrated.

The wires, that run from photocells 44 and 49 to commutator rings 33, 34, and 35, are contained in cable 55 that passes through tube 56. One end of the tube is supported in vacuum stand 32 in the copending application and the other in bracket 57 in FIG. 3. One end of the bracket is attached to plate 62 by means of screws 58, while plate 62 is attached to plug 60 by means of screw 61. The plug is located in the end of arm 39, and there is a small clearance between the plate and arm. Thus, the angle of peeler 48 may be adjusted by loosening screw 61 and adjusting the position of plate 62.

Cams 201 to 207 (FIG. 2) are located on cam shaft 63, which is driven by shaft 19 through gear 64, cogged timing belt 65, and gear 66. The gears and belt are designed so that two revolutions of shaft 63 are obtained during each revolution of 19. This arrangement provides two cycles of operation, described below, each controlled by cams 201 to 207 during alternate half revolutions of shaft 19. Stated differently, during each half-revolution of 19, one of the vacuum heads 42 on arm 39 (FIG. 1) attracts and turns a page of booklet 23. As each page is turned, cams 201 to 207 control the operations set forth below.

NOTATION

When FIGS. 4A and 4B are assembled as shown in FIG. 4, numbers ranging from 0 to 7 appear along the top and the letters A and B appear in the right-hand and left-hand margin of the assembled figure. This forms a coordinate system which may be used to locate the contacts of the relays in the figure. Each relay is related to a rectangle bearing the same number as the relay and arranged along the top of the assembled figure. For example, relay K102 is associated with rectangle 102 in FIG. 4A, which represents the latter relay and is divided into sections marked 5A and 3B, representing contacts 102–1 and 102–2 or contacts 1 and 2 of the relay, respectively. The notation in each section designates the location of the associated contacts in FIGS. 4A and 4B. Thus, to use the notation 5A to locate contacts 102–1, find the area between numbers 5 and 6 and proceed to A or the upper half of this area.

START OF OPERATION

After the operator places booklet 23 on table 24 (FIG. 1), if she wants to photograph a page, manually, she closes switch 69 (FIG. 4B) and depresses the momentary contact switch 70. A circuit is then completed from AC power source 71 through transformer 72 to contact 9 in camera 73, and the camera is triggered to take the photograph.

If the operator wants to place the system in automatic operation, she depresses momentary contact switch 76 to energize relays K4 and K11. When the former relay is energized, contacts 4–1 establish a holding circuit for K4 and K11, and contacts 11–1 complete the output circuit of DC power source 77.

She then closes switch 81 and depresses momentary contact switch 78. Potential is applied to pin 9 in camera 73 to trigger operation of the camera, which photographs the top page of booklet 23.

When switch 78 is closed, potential is applied through contacts 106–2 to energize relay K107. Contacts 107–1 close, picking up relay K104. Contacts 104–1 make, establishing a holding circuit for the latter relay, and contacts 104–3 close. Since contacts 4–2 were closed when relay K4 was energized, when 104–3 make, a circuit is completed to pick up relays K101, K112 and K114. Contacts 101–1 then complete a circuit to activate turner drive clutch 20.

SINGLE PAGE TEST

As set forth in detail in the copending application, vacuum head 42 is rotated in a selected plane on the end of revolving arm 39, which is driven by shaft 18 through an appropriate mechanical arrangement. The head is also rotated around its longitudinal axis. As the head engages an edge of the top page of booklet 23, the page is attracted to the head and turned.

During the period of the revolution arm 39 represented by angle A in FIG. 6, cam 203 rotates from 121° to 157° (FIG. 5) to open contacts CB–203 in FIG. 4B. This delineates the period when a test is made to determine whether more than one page of booklet 23 is being turned by vacuum head 42.

If during this period, more than one page of the booklet is being turned, the level of light that falls on photocell 49 changes its resistance to a value such that amplifier 51 energizes relay K123 and contacts 123–1 open. Relays K101 and K114 then drop out which in turn opens contacts 101–1, releasing turner drive clutch 20. Contacts 114–1 transfer and discharge capacitor 82 through brake coil 83, energizing the coil which is located in and activates brake 21 in FIG. 2. The brake stops shaft 19 and the automatic turner 22 comes to rest.

Relay K112 remains energized through the circuit that includes normally closed contacts 102–1, and closed contacts 4–2 and 104–3. Since relay K112 is energized, contacts 112–1 are closed, and since relay K101 is released, contacts 101–2 are closed. Relay K113 is then energized after a short time delay introduced by resistor 85 and capacitor 86. Contacts 113–1 open to break the circuit through relays K4 and K11, which drop out. Contacts 11–1 open to remove source 77 from the DC operated circuits. This prevents further operation of drive clutch 20 until the operator restarts page turner 22.

The operator notes the page of booklet 23 that should have been photographed during the present cycle of operation and then depresses switch 76, which energizes relay K11 to close contacts 11–1. This applies source 77 to the DC circuits.

She then throws reset switch 87 (FIG. 4B). This energizes relay K103 and contacts 103–1 transfer. Since arm 39 is not in its reset position, cam 205 is located somewhere between 14° and 334° of its rotation and contacts CB–205 are closed, as represented in FIG. 4B. Hence relays K114 and K101 are energized. Contacts 101–1 are closed, and since 11–1 were closed when relay K11 was energized, a circuit is completed from source 77 to activate clutch 20. Shaft 19 (FIG. 2) then drives cam shaft 63 through belt 65 and cam 205 rotates to 335° when contacts CB–205 open the circuit through relay K101, which drops out. Contacts 101–1 open to release clutch 20 and arm 39 comes to rest. In its rest position the arm is located substantially parallel to the back edge of table 24 in FIG. 1.

The operator then readjusts the pages of booklet 23 so that the next one to be photographed is on top, and restores switch 87 to its normally open position, which releases relay K103. She then depresses switch 78 to photograph the top page and to place the turner in automatic operation.

During the operation described just above, when reset switch 87 was closed and relay K103 was energized, contacts 103–2 transferred and a circuit was completed through resistor 89 to discharge capacitor 90. This prevented the charge on the capacitor from being used to take a picture, as described immediately below.

TURNED PAGE AND CAMERA INTERLOCK

Figure 5:
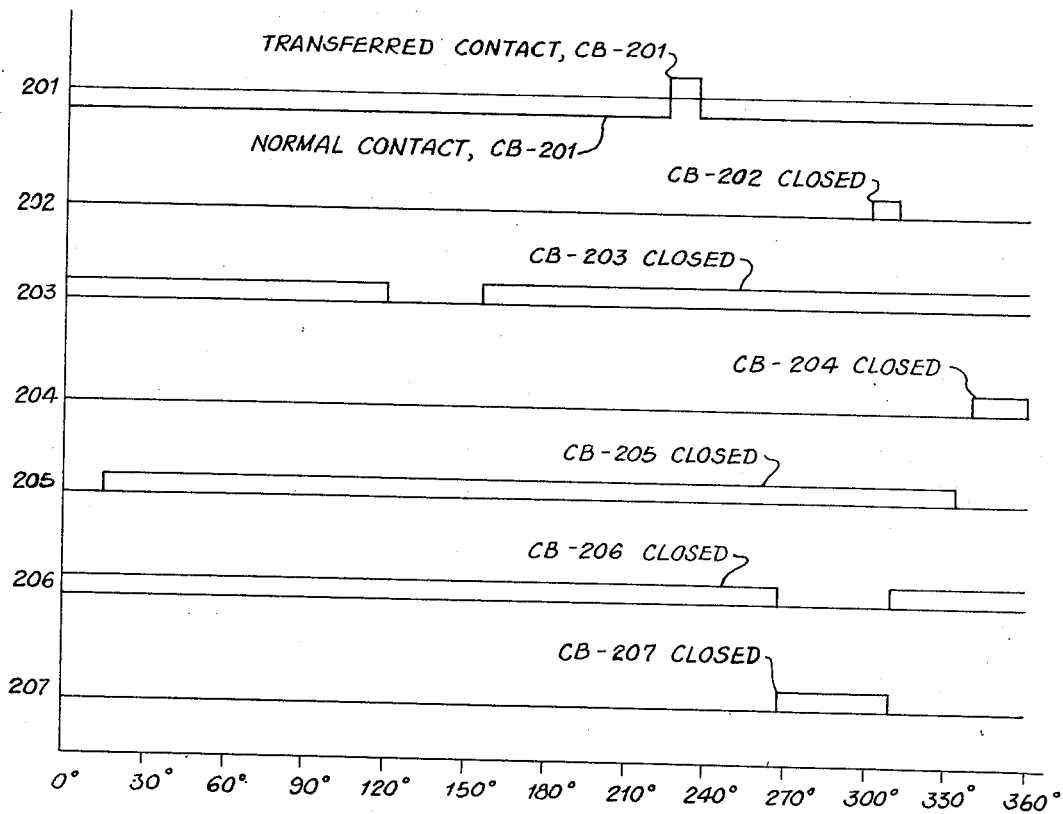
FIG. 5 is a timing chart used in explaining the operation of the cams shown in FIG. 2.

When arm 39 is rotated through angle B as illustrated in FIG. 6, cam 201 rotates from 224° to 236° as represented in FIG. 5 and transfers the armature of contacts CB–201 (FIG. 4A) from its normal to its transferred contact.

As previously noted, photocell 44 is positioned on vacuum head 42. When the photocell is covered by a single page being turned by the head, the resistance of the photocell has a value such that amplifier 46 energizes relay K121 and contacts 121–1 close. A circuit is then completed through closed contacts 121–1 and transferred contacts CB–201 to charge capacitor 90.

After arm 39 completes its rotation through angle B, the armature of contacts CB–201 transfers to its normal contact. The charge remains on capacitor 90 until the camera cycle is initiated.

As arm 39 rotates through angle D, the cam 202 rotates from 301° to 311°, and contacts CB–202 close. This completes a path for the capacitor 90 which discharges through relay K105, energizing the relay momentarily. Contacts 105–1 close, and since switches 69 and 81 were closed previously a circuit is completed to terminal 9, which triggers operation of the camera 73.

If, on the other hand, a page is not turned as arm 39 rotates through angle B, the light on photocell 44 does not change the value of its resistance and amplifier 46 does not energize relay 121. Capacitor 90 will then remain uncharged and a photograph will not be taken during the camera cycle. Thus, a photograph is taken during the camera cycle only if a page has been turned by cacuum head 42 as indicated by the test performed as arm 39 rotates through angle B.

FLATNESS TEST

Consideration will now be given to the flatness test.

The light emitted from source 91 (FIG. 1) is substantially parallel to the top of table 24 and passes over the turned pages of booklet 23 to photocell-amplifier unit 92. Source 91 includes lamp 93 and unit 92 includes photocell 94 and amplifier 95, as illustrated in FIG. 4A.

As arm 39 rotates through angle C (FIG.6), cam 206 rotates from 268° to 311° (FIG. 5) and contacts CB–206 (FIG. 4B) are opened during this time interval. Simultaneously, cam 207 closes contacts CBX207 to energize lamp 93 which excites photocell 94.

Under normal operating conditions, the pages of booklet 23 after being turned, will be flat and the beam of light, provided by the lamp 93, will fall on the photocell 94. The resistance of the photocell will be such that the output of amplifier 95 will not activate relay K124.

If, however, after being turned a page of booklet 23 is not flat, the beam of light will be broken and amplifier 95 will energize relay K124. Contacts 124–1 will open, and relays K101 and K114 drop out. From here the operation is the same as described above under "Single Page Test," and as indicated there, contacts 101–1 open to release drive clutch 20 and arm 39 and vacuum head 42 come to rest.

SPOT DETECTION

A black spot 96 (FIG. 1) is located on a selected one of the pages( for example, the last one, in booklet 23.

The operations just described will continue during each cycle of operation, and each page of booklet 23 will be turned in sequence by vacuum heads 42 until the light from source 97 is reflected from the spot 96 and falls on the photocell in unit 98. The latter unit includes a photocell 100 (FIG. 4A) connected across the input to amplifier 99. Relay K122 is positioned across the output of the amplifier.

When the dark spot 96 is sensed by photocell 100, the rotation of arm 39 and vacuum heads 42 are terminated and certain relays are de-energized. More specifically, as arm 39 rotates through angle E in FIG. 6, cam 204 rotates from 340° to 360° as shown in FIG. 5 and closes contacts CB–204 in FIG. 4A. If a dark spot is sensed during this time interval, the resistance of photocell 100 is changed and amplifier 99 activates relay K122. Contacts 122–1 are closed to pick up relay K102. Contacts 102–2 open to drop out relay K104, and contacts 102–1 open, releasing relays K101, K114 and K112.

When relay K101 is released, contacts 101–1 open the circuit to drive clutch 20 which is released. Arm 39 and heads 42 then come to rest.

When relay K112 drops out, contacts 112–1 open and relay K113 is de-energized. Contacts 113–1 close and a circuit is completed through contacts 4–1 and 113–1, which maintains relay K11 energized. Contacts 11–1 remain closed and voltage is applied to the DC circuits by source 77.

The operator may now replace booklet 23 with another one to be photographed, and may depress momentary contact switch 78 (FIG. 4B) to place the page turner in automatic operation as described above under "Start of Operation."

What is claimed is:
1. In a system wherein the pages of a bound volume are turned automatically in sequence by a page turner, flattened, and then photographed by a camera, a test and control circuit comprising:
   means for generating a first control signal when a single page of said volume is turned during a cycle of operation of said turner,
   means responsive to said first control signal for effecting operation of said camera,
   means for generating a second control signal when more than one page of said volume is turned by said page turner during a cycle of its operation; and
   means responsive to said second control signal for inactivating said page turner.
2. The system set forth in claim 1 including:
   means for generating a third control signal when a page of said volume has not been flattened after being turned by said turner, and
   means responsive to said third control signal for inactivating said page turner.
3. The system set forth in claim 1 including:
   means for holding the pages of said volume in a substantially flat position,
   means for providing a beam of light and for directing the light beam along a path substantially parallel to the turned pages,
   a photocell positioned to respond to said light beam after the beam passes over the turned pages,
   means responsive to the value of the resistance of said photocell for generating a third control signal, and
   means responsive to said third control signal for inactivating said page turner.
4. The system set forth in claim 1 wherein the means responsive to said first control signal for effecting operation of said camera comprises:
   a source of energy,
   an energy storage device,
   means responsive to said first control signal for applying said source of energy to said storage device,
   control means responsive to the energy stored in said device for operating said camera, and
   means for applying the energy stored in said device to said control means.
5. The system set forth in claim 1 wherein the mechanism for engaging and turning each page of said volume has a reset position and the test and control circuit includes:
   a reset switch,
   means responsive to the operation of said reset switch for moving said mechanism to its reset position, and
   means responsive to the operation of said reset switch for preventing operation of said camera.
6. In an automatic page turner comprising:
   a hollow vacuum head and an arm, each having a longitudinal axis, said vacuum head containing a plurality of holes and being rotatably mounted on said arm,
   means for revolving said arm in such a manner that its longitudinal axis revolves in a selected plane,
   means for rotating said vacuum head around its longitudinal axis,
   means for holding the pages of a booklet in a substantially flat position and for positioning said booklet so that the vacuum head engages an edge of each page in succession as it is rotated,
a source of vacuum having an output connected to said head,
means for applying the output of said source to said head during a time interval that starts prior to the time that the head engages an edge of the top page of said booklet and extends to the time after said head passes the center of said booklet, whereby each page is attracted to said vacuum head and turned, and
means for flattening each page after it has been turned, the improvement comprising:
photoelectric means positioned in a fixed location relative to the revolving arm and responsive to a first predetermined level of light for providing a first control signal when a single page of said booklet is turned during a cycle of operation of said vacuum head,
a camera,
means responsive to said first control signal for operating said camera,
photoelectric means positioned in a fixed location relative to said revolving arm and responsive to a second predetermined level of light for providing a second control signal when more than one page of said booklet is turned during a cycle of operation of said arm, and
means responsive to said second control signal for inactivating the means for revolving said arm and the means for rotating said vacuum head.

7. The automatic page turner set forth in claim 6 including:
means for generating a third control signal when a page of said booklet has not been flattened after being turned by said vacuum head, and
means responsive to said third control signal for inactivating the means for revolving said arm and the means for rotating said vacuum head.

8. The automatic page turner set forth in claim 6 including:
means for providing a beam of light and for directing said light beam along a path substantially parallel to said turned pages,
a photocell positioned to respond to said light beam after the beam passes over the turned pages,
means responsive to the value of the resistance of said photocell for generating a third control signal, and
means responsive to said third control signal for inactivating the means for rotating said arm and the means for rotating said vacuum head.

9. The page turner set forth in claim 6 including:
a source of energy,
an energy storage device,
means responsive to said first control signal for applying said source of energy to said storage device,
a camera,
control means responsive to the energy stored in said device for operating said camera, and
means for applying the energy stored in said device to said control means.

10. The page turner set forth in claim 6 including:
means responsive to a spot located on a selected page of said booklet for generating a fourth control signal, and
means responsive to said fourth control signal for inactivating the means for revolving said arm and the means for rotating said vacuum head.

11. The automatic page turner set forth in claim 6 wherein said arm has a reset position and the page turner includes:
a reset switch,
means responsive to the operation of said reset switch for moving said arm to its reset position,
a camera, and
means responsive to the operation of said reset switch for preventing operation of said camera.

No references cited.

JAMES W. LAWRENCE, Primary Examiner

C. R. CAMPBELL, Assistant Examiner

U.S. Cl. X.R.
250—215, 220